Patented Apr. 4, 1944

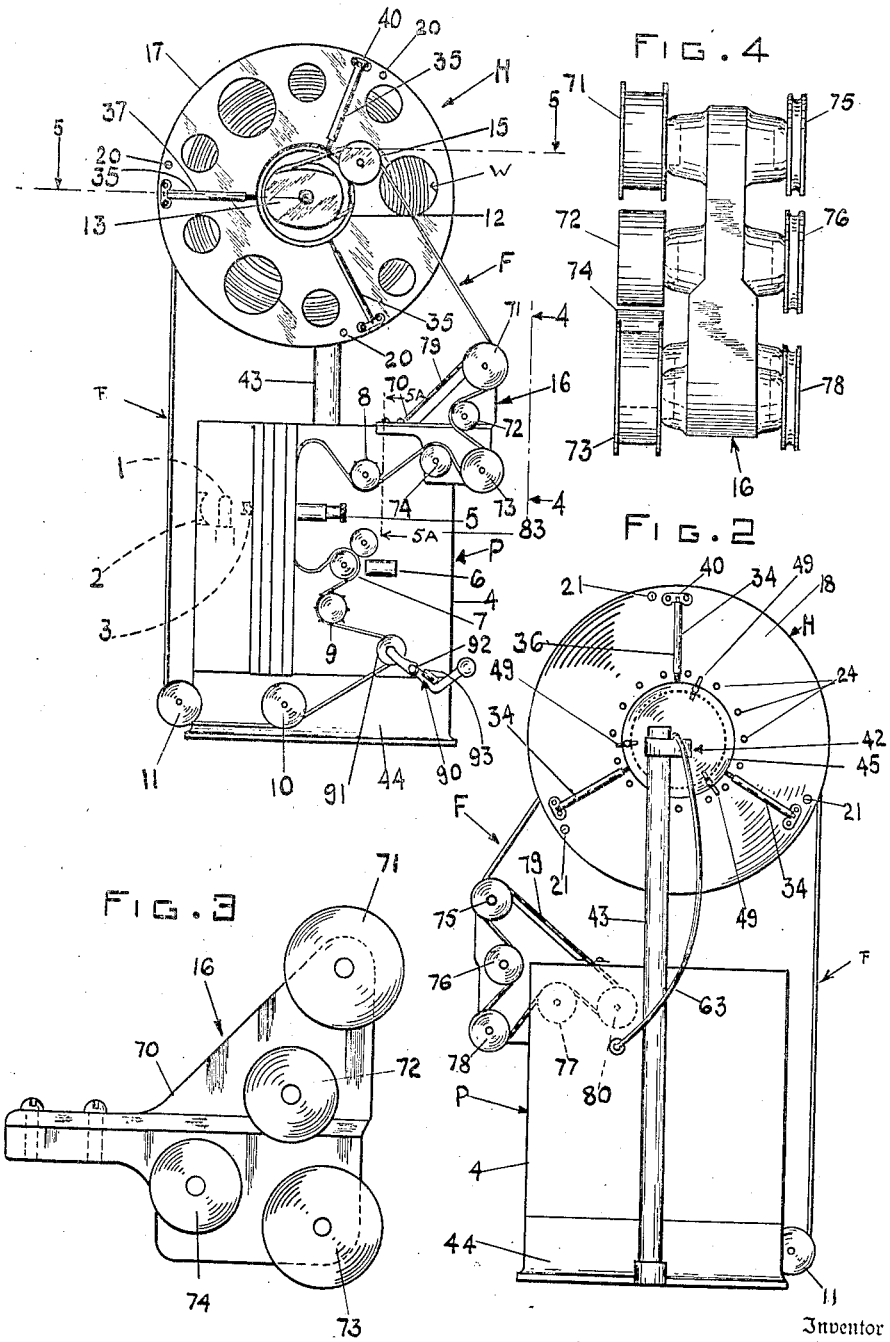

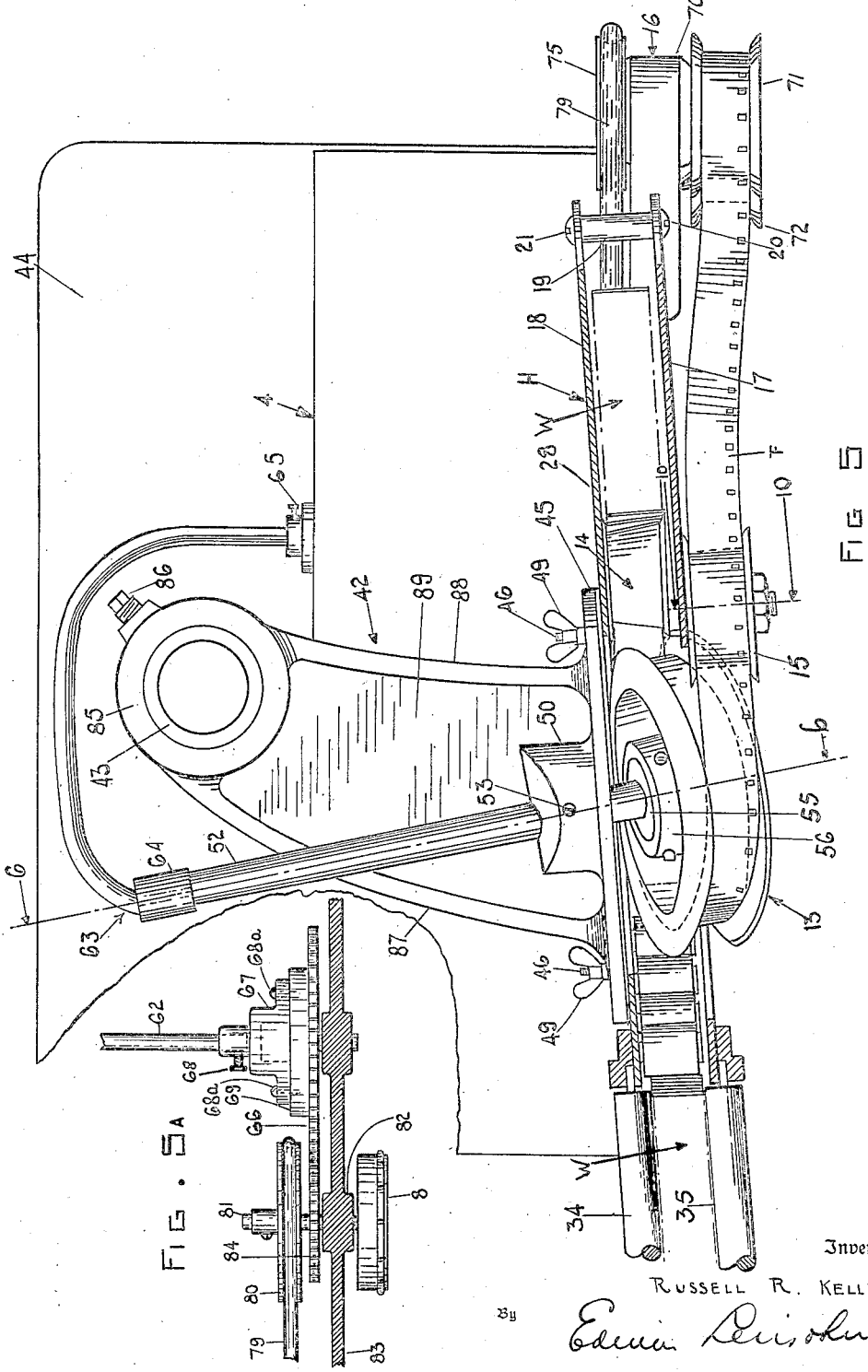

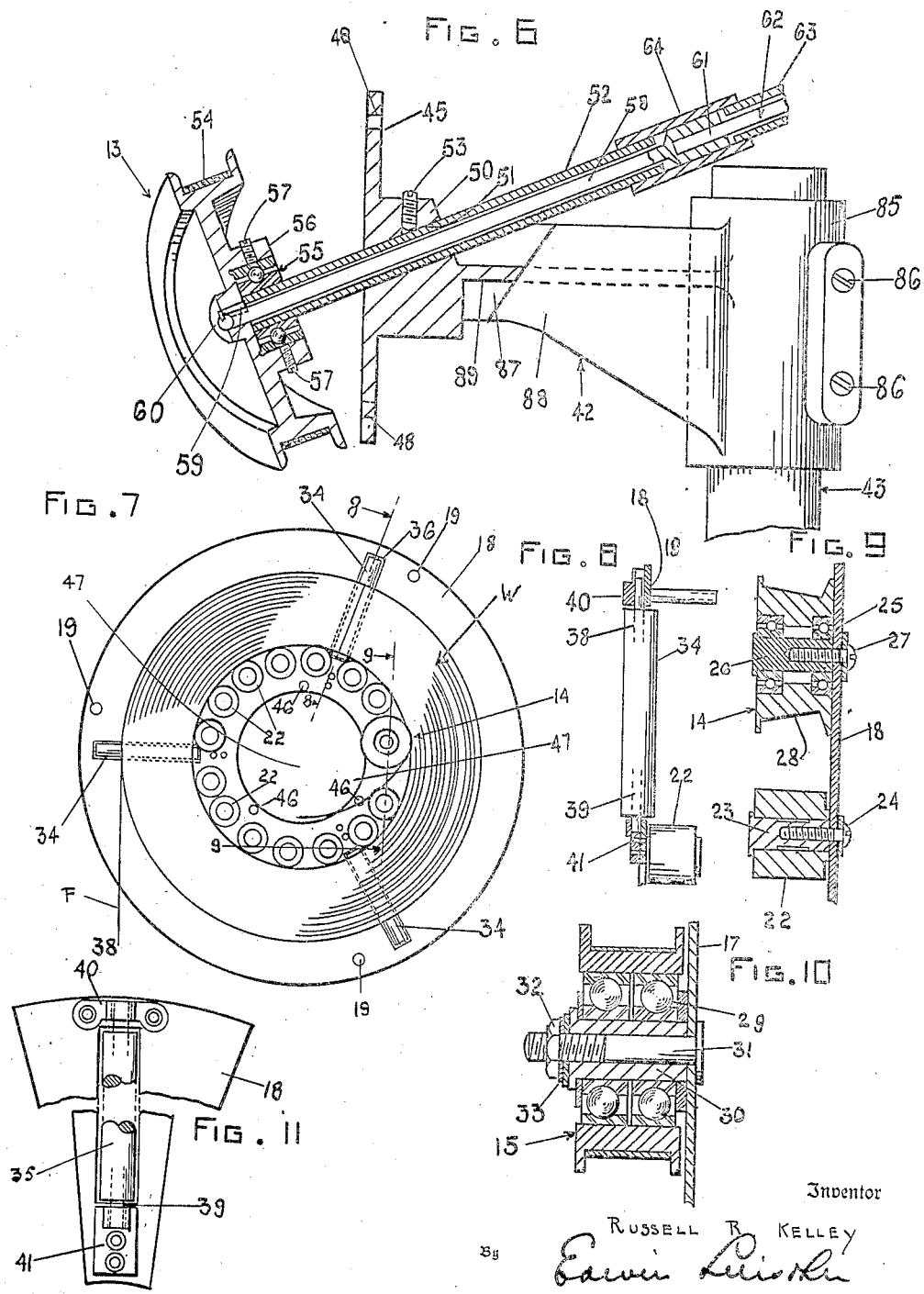

2,345,818

UNITED STATES PATENT OFFICE 2,345,818

MOTION PICTURE PROJECTION APPARATUS

Russell R. Kelley, Jackson Heights, N. Y., assignor to International Mutoscope Reel Co. Inc., Long Island City, N. Y., a corporation of New York Application July 11, 1941, Serial No. 401,926

18 Claims. (Cl. 88—18.7)

This invention relates to motion picture projection apparatus and more particularly to means for supplying and feeding the motion picture film to the projector.

The present invention relates more specifically to motion picture projection apparatus wherein the film is of the endless type, and is arranged in the form of a roll or winding in a holder, the arrangement being such that the film passing to the projector is withdrawn progressively from the innermost convolution of the winding in the holder and, after having passed through the projector is arranged progressively as the outermost convolution of said winding or roll in the holder. As the film in the winding may be of substantial length, especially where the roll of film consists in reality of a plurality of individual films in respect to different subjects, respectively, substantial force may be required to advance the film from the winding in the holder to the projector for the reproduction of the film. It is, therefore, an object of the present invention to provide improved means for withdrawing the film from the holder and for advancing the same to the projector.

Another object of the invention is to provide film supplying means of the type described above which can be readily associated with or applied to any suitable motion picture projector, more or less as an attachment thereto, and in this connection a further object of the invention is to provide a device of simple construction and one easily installed for associating the film supplying and feeding means with the projector of the apparatus.

A further object of the invention is to associate with the holder for the film roll or winding improved means for progressively withdrawing the innermost convolution of the winding from the plane thereof to a laterally displaced plane in which the film moves to the projector.

Another object of the invention is to provide improved and simplified means for supporting the film holder and the take-off roller.

A yet further object of the invention is generally to provide improved film supply and feeding means of the type wherein the film is endless and in the form of a roll or winding.

The invention will be best and more fully understood from the following description, reference being had to the accompanying illustrative drawings.

In the drawings:

Fig. 1 is a view in elevation of one side of the motion picture projection apparatus embodying the present invention;

Fig. 2 is a view similar to Fig. 1 showing the other side of the apparatus;

Fig. 3 is a side view, on a larger scale, of a film advancing unit forming a part of the film feeding means of the present invention;

Fig. 4 is a view, in elevation, of the unit shown in Fig. 3 as seen along the line 4—4 of Fig. 1;

Fig. 5 is a top plan view, on a larger scale, of the apparatus illustrated in Fig. 1 the film holder being shown in section as though taken on a line 5—5 of Fig. 1;

Fig. 5A is a sectional view on the line 5A—5A, of Fig. 1;

Fig. 6 is a side view in elevation, partly in section, of the bracket for supporting the film holder and the take-off roller, said take-off roller and parts associated therewith being shown in section as though taken along the lines 6—6 of Fig. 5, the film holder being omitted;

Fig. 7 is a side view of the film holder, one of the sides of said holder being removed for the purposes of illustration;

Fig. 8 is a sectional view along the line 8—8 of Fig. 7;

Fig. 9 is a sectional view along the line 9—9 of Fig. 7;

Fig. 10 is a detail sectional view along the line 10—10 of Fig. 5;

Fig. 11 is a fragmentary side view in elevation of one of the sides of the film-holder.

Referring now to the drawings in further detail, the film supplying and feeding means embodying the present invention is shown in Figs. 1 and 2 in association with and in operative relation to a motion picture projector P which may be of any suitable type and, of course, said projector may include and be operatively related with sound-on-film reproducing devices, since ordinarily the film is adapted for the reproduction of sound as well as pictures. Fig. 1 shows in dotted lines the projector lamp 1, the reflector 2, and the condensing lens 3, mounted within the usual housing associated with the casing 4 of the projector, and there is also shown in this view the projection lens 5, and the light slit tube 6 and the drum 7 constituting parts of the sound reproducing equipment. The upper feed sprocket is indicated at 8 and the lower sprocket is indicated at 9. As the projector has, conventionally, an intermittent feed mechanism, loops are provided in the film between the film path of the projector and the sprockets 8 and 9, respectively.

In accordance with the present invention the film F is supplied to the projector P from the holder H in which the film is mounted in the form of a winding or roll W (Fig. 7), it being understood that innermost convolution of said winding is progressively withdrawn from the holder and is advanced to the projector P for reproduction by the latter of the pictures and/or sound, the film which has passed through the projector being returned to the holder and rewound progressively as the outermost convolution of the winding. Rollers 10 and 11 are mounted on the casing or base of the projector in position to guide the film in its return movement to holder H. By reference to Fig. 1 it will be observed that the film is withdrawn through a central opening 12 in holder H and is withdrawn from said holder by a rotary take-off roller 13 to which the film is directed by a guide roller 14 carried by the holder adjacent the innermost convolution of the film as clearly shown in Fig. 7. From the take-off roller, the film passes to a rotary guide roller 15, carried by the holder externally thereof, and from the latter to the rollers of the film advancing unit 16 from which the film passes to the upper feed sprocket 8 of the projector.

Referring now more particularly to the film holder H, the latter comprises side plates 17 and 18 disposed in parallel spaced relation and removably held together in said relation by spacer sleeves 19 threaded internally for the reception of screws 20 which pass through plate 17 and by screws 21 which pass through plate 18. By reference to Fig. 1 it will be noted that the opening 12 for withdrawing the film from the holder is provided in plate 17. As shown in Fig. 7, the film winding or roll W is supported on rollers 22, said rollers being carried by plate 18 and arranged in circle formation. Each roller 22 is in the form of a sleeve journalled for rotation on a cylindrical pin 23 removably held in position by a screw 24 which passes through plate 18 and is threaded into said pin.

The above mentioned guide roller 14 is also carried by plate 18 in position to direct the film to take off roller 13. The location of roller 14 is of considerable importance from the point of view of obtaining best results in the movement of the film out of the holder without danger of tearing or otherwise injuring the film. Accordingly, it will be noted that as shown in Fig. 7, roller 14 is positioned so that its axis is above the horizontal center line of the holder, the roller being thus positioned so that the weight of the film roll W bears on said roller at the point where the film leaves the winding in moving to the take-off roller 13. It will be understood that as the film is withdrawn from the holder, the roll or winding W of the film rotates as a unit and that by reason of the fact that the weight of the film roll is on roller 14 as well as on the upper group of rollers 22, the part of the innermost convolution on which the take-off force is exerted is pressed against the adjacent convolution by the weight of the film roll so that the take-off force is communicated to the film roll as a whole for turning the same in the holder. As shown in Fig. 9 guide roller 14 is mounted for rotation on a ball bearing 25 mounted on a cylindrical pin 26 removably secured to plate 18 by a screw 27 which passes through said plate and is threaded into said pin. It will be noted that the peripheral surface 28 of roller 14 is tapered inwardly, i. e., toward the inner surface of plate 18, for a purpose subsequently to be explained.

Guide roller 15 is carried by plate 17 and as shown in Fig. 10 is mounted for rotation on a ball bearing 29 carried by a sleeve 30 held in position by a headed pin 31 which passes through plate 17 from the inner surface thereof and which is engaged at its outer threaded end by a nut 32 and a locking washer 33. Anti-friction rollers 34 are mounted in plate 18 and similar anti-friction rollers 35 are mounted in plate 17, said rollers being spaced circumferentially of said plates, respectively, and extending radially from the centers thereof. Said rollers 34 and 35 project through openings 36 and 37 in plates 18 and 17, respectively, beyond the inner surfaces of their companion plates, as illustrated in Fig. 8 in reference to rollers 34 and companion plate 18. Said rollers are thus positioned to engage the opposite sides, respectively, of the film roll. Rollers 34 and 35 are preferably formed of cylindrical rods of any suitable material, for example, lucite, glass, metal, etc., and are mounted for rotation by means of pins 38 and 39 secured at their opposite ends, respectively, as clearly shown in Figs. 8 and 11 journalled for rotation in bearing members 40 and 41 secured to the companion plates 17 and 18, respectively, on the outer surfaces thereof.

One of the features of the present invention resides in the means for supporting the film holder H and the take-off roller 13. Said supporting means includes a bracket 42 carried by a post 43 which is fixed to and upstands from the base 44 on which the projector P is mounted. Bracket 42 is provided with a flange 45 for supporting holder H. Said holder is removably secured to flange 45 of the bracket by means of threaded pins 46 secured to plate 18 near the central opening 47 therein. Said pins project through openings 48 in flange 45 and are engaged by wing nuts 49 so that the holder H can be easily attached to and removed from bracket 42. As shown in Figs. 5 and 6, said bracket 42 is provided with a boss 50 adjacent flange 45. Said boss is provided with a bore 51 which is downwardly and laterally inclined, and a tubular member 52 is adjustably mounted in said bore and secured in adjusted position by a set screw 53. It will be understood that tubular member 52 slidably fits in bore 51 and, in effect, forms a part of the bracket.

The take-off roller 13 is mounted for rotation at the forward end of said tubular member 52 and is thereby positioned in the above described inclined relation whereby said take-off roller is arranged to direct the film outwardly of the holder to the guide roller 15 and whereby the peripheral surface of take-off roller 13 which is engaged by the film is in such relation to the tapered surface 28 of inner guide roller 14 that the film lies flat against the peripheral surface of take-off roller 13 for the full width of said film. Said peripheral surface of the roller which is engaged by the film is provided with a friction surface 54 formed by a layer of suitable friction material such as, for example, a composition of cork and rubber. The end of tubular member 52 on which take-off roller 13 is mounted is provided with a ball bearing 55, the inner race of which is fixed to said tubular member, the hub 56 of the take-off roller being fixed to the outer race of said ball bearing in any suitable way as by set screws 57.

Take-off roller 13 is driven in timed relation to the feed of the film through the projector whereby said take-off roller positively withdraws the film from the roll support in holder H. For this purpose a rod 58 (Fig. 6) is connected at its forward end in any suitable way, as by means of a key 59, to the center portion 60 of said take-off roller. Said rod 58 is disposed within tubular member 52 and has connected thereto one end 61 of a flexible shaft or cable 62. Said flexible shaft 62 extends through a flexible sheath 63 connected at one end thereof to tubular member 52 by a sleeve 64 and connected at its other end to casing 4 of the projector P by a set screw 65 (Fig. 5). As shown in Fig. 5A flexible shaft 62 is connected to and driven by a gear 66 of the gear train of the projector P, and for this purpose the inner end of said flexible shaft is secured to a coupling member 67 by means of a set screw 68. Said coupling member 67 is fixed in any suitable way as by means of screws 68A to the metal reinforcing plate 69 to which gear 66 is fastened, usually by being riveted thereto. It will be understood that the gear train of which gear 66 is a part is actuated by the main drive shaft of the projector.

The film withdrawn from the winding is positively advanced to the sprocket wheel 8 by the above mentioned unit 16. Said unit comprises a bracket 70 mounted on and secured to the top of projector casing 4. A plurality of rollers 71, 72, 73, and 74 are mounted for rotation in bracket 16, said rollers having in fixed relation thereto, respectively, driving pulleys 75, 76, 77, 78, respectively. Said pulleys are engaged by a belt 79, as illustrated in Fig. 2 driven by a pulley 80. The rollers of unit 16 are preferably provided with peripheral friction surfaces like that of take-off roller 13.

As shown in Fig. 5A pulley 80 is fixed to and is rotated by the shaft 81 which rotates the sprocket wheel 8. As shown, said shaft 81 is journalled for rotation in the bearing portion 82 formed in side wall 83 of the casing 4 of the projector, and it will be noted that shaft 81 is rotated by a gear 84 which is turned by the above mentioned gear 66 of the gear train of the projector. Pulley 80 is of the same diameter as sprocket wheel 8 and the film advancing rollers of unit 16 are operated at a speed equal to the speed of movement of the film by sprocket wheel 8. Belt 79 is preferably elastic so that it can stretch and contract in response to the load on the rollers of the feed unit 16, so that the film is engaged by the sprocket teeth of the sprocket wheel 8 without substantial force, thus relieving the portions of the film adjacent the sprocket holes therein from any tension or pressure by the sprocket teeth which might otherwise tend to tear the film. In this connection, it will be understood that the speed of movement of film F by unit 16 is automatically regulated in relation to the movement of said film by sprocket 8, for if the film is advanced at a rate which is either faster or slower than the feeding movement of the sprocket, the pressure of the film on the sprocket teeth or the pressure of the sprocket teeth on the film will increase the load on belt 79 causing the latter to stretch somewhat and thereby slightly decrease the driving speed of the rollers of unit 16.

Referring further to the bracket 42 for supporting the film holder H, it will be observed that said bracket is secured to post 43 for adjustment circumferentially as well as vertically of said post. For this purpose the bracket is provided with a cylindrical part 85 into which the post 43 fits. Said part 85 is secured in adjusted position by set screws 86. By thus providing for the angular adjustment of bracket 42, the film holder H can be disposed in proper angular relation to the guide rollers 10 and 11 (Fig. 1) so that the outer peripheral edge of the holder at which the film is returned to the holder is in substantial vertical alignment with the part of the film returning from the projector to the holder for rewinding in film roll W. Bracket 42 is preferably formed as a casting and has in addition to the above described parts sides 87 and 88 integral with a cross web 89.

It will be understood that the projection apparatus described above can be mounted in a cabinet (not shown) having a screen on which the reproduced images appear, said cabinet also being preferably provided with a loud speaker and sound reproducing equipment. Further, as the projection apparatus of the present invention is intended primarily for commercial operation, the cabinet will ordinarily be provided with a coin actuated mechanism for controlling the operation of the projector. The cabinet and the auxiliary mechanisms are not shown as they can be of any suitable type and do not in themselves form part of the present invention. However, since the film might break it is desirable to provide a device for stopping the operation of the apparatus and for indicating the cause of the stopping of the apparatus due to the breaking of the film so that this can be observed by an attendant. For this purpose a switch device 90, indicated more or less diagrammatically in Fig. 1, is provided. Said switch device includes a mercury switch 93 and a roller 91 which is engaged by the film. In case the film breaks device 90 roller 91 is released so that device 90 can pivot by gravity about its axis 92 so that mercury switch 93 closes the circuit of a signal (not shown) disposed externally of the cabinet thus to flash a signal when the film breaks.

Having thus described my invention what I claim and desire to secure by Letters Patent is:

1. A self-winding film reel for a motion-picture projector, comprising a stationary holder for a film winding, said holder having a central axial opening through which the innermost convolution of the film winding is progressively withdrawn, a film take-off roller, means for supporting said take-off roller for rotation in said opening of the film holder substantially centrally thereof, said supporting means comprising a bracket having a tubular part on which said take-off roller is mounted for rotation, said tubular part being adjustable axially of said opening, means for releasably securing said tubular part in said bracket, and means in said tubular part operatively connected to said take-off roller for rotating said roller.

2. A self-winding film reel for a motion picture projector, comprising a holder for a film winding, said holder having a central axial opening through which the innermost convolution of the film winding is progressively withdrawn, a film take-off roller, means for supporting said take-off roller for rotation in said opening of the film-holder, said supporting means comprising a bracket having a tubular part on which said take-off roller is mounted for rotation, and means in said tubular part operatively connected to said take-off roller for rotating said roller, said tubular part having a portion positioned in said axial opening at an angle to the axial line of said opening so that as said roller rotates a film-engaged peripheral portion thereof is located externally of said opening for directing the film outwardly of said opening for passage to the projector.

3. A self-winding film reel for a motion-picture projector, comprising a stationary holder for a film winding, said holder having a central axial opening through which the innermost convolution of the film winding is progressively withdrawn, a film take-off roller positioned for rotation in said opening, means for rotating said roller and means for supporting said film-holder and said take-off roller comprising a bracket carrying said film-holder and having a tubular part on which said take-off roller is mounted for rotation, said bracket having an opening therethrough and said tubular part projecting through said bracket opening and slidable therein for adjusting the position of said roller in relation to said holder.

4. A self-winding film reel for a motion-picture projector, comprising a holder for a film winding, said holder having a central axial opening through which the innermost convolution of the film winding is progressively withdrawn, a film take-off roller positioned for rotation in said opening, means for supporting said film-holder and said take-off roller comprising a bracket carrying said film holder and having a tubular part on which said take-off roller is mounted for rotation, said bracket having an opening therethrough and said tubular part projecting through said bracket opening and slidable therein for adjusting the position of said roller in relation to said holder, and means in said tubular part operatively connected to said take-off roller for rotating said roller, said tubular part extending axially through said first mentioned opening and being positioned so that as said roller rotates a film-engaged peripheral portion thereof is located externally of said first mentioned opening for directing the film outwardly of said opening for passage to the projector.

5. A self-winding film reel for a motion-picture projector, comprising a holder for a film winding, said holder having a central opening through which the innermost convolution of the film winding is progressively withdrawn, a film take-off roller, means for supporting said take-off roller for rotation in said opening of the film-holder, said supporting means comprising a bracket having a tubular part on which said take-off roller is mounted for rotation, means in said tubular part operatively connected to said take-off roller for rotating said roller and a flexible shaft connected to the drive shaft of the projector, and to said roller-rotating means for actuating the latter in timed relation to the operation of the projector.

6. A self-winding film reel for a motion-picture projector, comprising a holder for a film winding, said holder having a central axial opening through which the innermost convolution of the film winding is progressively withdrawn, a stationary tubular member projecting into said axial opening, said tubular member being inclined to the axis of said opening, a film take-off roller journalled for rotation on said tubular member concentrically thereof in said holder-opening, a shaft rotatable in said tubular member and operatively connected to said take-off roller for rotating the same, and means connected to said shaft for rotating the same in timed relation to the operation of said projector.

7. A self-winding film reel for a motion-picture projector having film-feeding means, comprising a holder for a film winding, said holder having a central axial opening through which the innermost convolution of the film winding is progressively withdrawn, a film take-off roller mounted for rotation in said opening substantially centrally thereof, said take-off roller being inclined to the axis of said film winding so that a peripheral part of said take-off roller turns in said opening in line with said film winding and another peripheral part of said take-off roller turns externally of said opening for directing the film outwardly therefrom for passage to the projector, means for rotating said take-off roller and a plurality of driven rollers mounted for rotation externally of said holder and adapted to be driven by said projector and engaging said film between said take-off roller and said film-feeding means for feeding the film to the film-feeding means of the projector.

8. A self-winding film reel for a motion-picture projector, comprising a holder for a film winding, said holder having a central opening through which the innermost convolution of the film winding is progressively withdrawn, a film take-off roller mounted for rotation in said opening, said take-off roller being inclined to the axis of said film winding so that a peripheral part of said take-off roller turns in said opening in line with said film winding and another peripheral part of said take-off roller turns externally of said opening for directing the film outwardly therefrom for passage to the projector, a plurality of driven rollers mounted for rotation externally of said holder and adapted to be driven by said projector for feeding the film to the film-feeding means of the projector, each of said rollers having a pulley for rotating the same, and an extensible belt engaging said pulleys and adapted to be driven by the projector for actuating said pulleys.

9. A self-winding film reel for a motion-picture projector, comprising a holder for a film winding, said holder having a central opening through which the innermost convolution of the film winding is progressively withdrawn, a film take-off roller mounted for rotation in said opening, a guide roller mounted in position between said take-off roller and the innermost convolution of the film for guiding the film to said take-off roller, said guide roller having an inwardly tapering peripheral surface which is engaged by the film as it is withdrawn from the winding, said take-off roller being inclined toward said guide roller at an angle corresponding substantially to the degree of taper of said guide roller, said take-off roller being also inclined to the axis of said film winding so that a peripheral part of said take-off roller turns in said opening in line with said film winding and another peripheral part of said take-off roller turns externally of said opening for directing the film outwardly therefrom for passage to the projector.

10. A self-winding film reel for a motion-picture projector comprising a holder for a film winding, said holder having a central opening through which the innermost convolution of the film winding is progressively withdrawn, a film take-off roller mounted for rotation in said opening, a guide roller mounted in position between said take-off roller and the innermost convolution of the film for guiding the film to said take-off roller, said guide roller having an inwardly tapering peripheral surface which is engaged by the film as it is withdrawn from the winding, and a bracket for supporting said take-off roller in a position inclined toward said guide roller and also in such position that as said take-off roller rotates a film-engaged peripheral portion thereof is located externally of said opening for directing the film outwardly of said opening for passage to the projector.

11. A self-winding film reel for a motion- picture projector, comprising a holder for a film winding, said holder having a central opening through which the innermost convolution of the film winding is progressively withdrawn, a film take-off roller mounted for rotation in said opening, a guide roller mounted in position between said take-off roller and the innermost convolution of the film for guiding the film to said take-off roller, said guide roller having an inwardly tapering peripheral surface which is engaged by the film as it is withdrawn from the winding, a bracket for supporting said take-off roller in a position inclined toward said guide roller and also in such position that as said take-off roller rotates a film-engaged peripheral portion thereof is located externally of said opening for directing the film outwardly of said opening for passage to the projector, and means for removably securing said film-holder to said bracket.

12. A self-winding film reel for a motion-picture projector, comprising a holder for a film winding, said holder having a central opening through which the innermost convolution of the film winding is progressively withdrawn, a film take-off roller positioned for rotation in said opening, and means for supporting said film-holder and said take-off roller comprising a post and a bracket mounted on said post and carrying said film-holder and said take-off roller, said bracket being adjustable circumferentially of said post whereby to position said film holder so that the outermost convolution of the film winding is substantially in line with the part of the film which has passed through the projector and is being directed for the return thereof to said film winding.

13. A self-winding film reel for a motion-picture projector, comprising a holder for a film winding, said holder having a central axial opening through which the innermost convolution of the film winding is progressively withdrawn, a film take-off roller positioned for rotation substantially centrally in said opening, means carrying said film holder and said take-off roller, means for adjustably mounting said carrying means whereby to position said film holder so that the outermost convolution of the film winding is substantially in line with the part of the film which has passed through the projector and is being directed for the return thereof to said film winding, and means for adjusting said take-off roller in relation to said film holder in a direction axially thereof.

14. A self-winding film reel for a motion-picture projector, comprising a holder for a film winding, said holder having a central opening through which the innermost convolution of the film winding is progressively withdrawn, a film take-off roller mounted for rotation in said opening, a guide roller mounted in position between said take-off roller and the innermost convolution of the film for guiding the film to said take-off roller, said guide roller having an inwardly tapering peripheral surface which is engaged by the film as it is withdrawn from the winding, a bracket for supporting said take-off roller in a position inclined toward said guide roller and also in such position that as said take-off roller rotates a film engaged peripheral portion thereof is located externally of said opening for directing the film outwardly of said opening for passage to the projector, said bracket having a bore extending along a line inclined laterally toward said guide roller and downwardly from the axis of the film winding, and a tubular member fixed in said bore and similarly inclined in relation to said guide roller and said axis of the film winding and having a part projecting into said opening of the film-holder, said projecting part forming a bearing for said take-off roller.

15. A self-winding film reel for a motion-picture projector, comprising a holder for a film winding, said holder having a central opening through which the innermost convolution of the film winding is progressively withdrawn, a film take-off roller positioned for rotation in said opening, and means for supporting said film-holder and said take-off roller comprising a bracket having a flange to which said film-holder is secured and a part projecting beyond said flange into said opening of the film holder, said projecting part forming a bearing for said take-off roller.

16. A self-winding film reel for a motion-picture projector, comprising a holder for a film winding, said holder having a central axial opening through which the innermost convolution of the film winding is progressively withdrawn, a film take-off roller mounted for rotation in said opening substantially centrally thereof, a plurality of rollers carried by said holder and engaging the film winding at the innermost convolution thereof for rotatably supporting said winding in said holder, one of said last mentioned rollers having its surface tapering in the direction of the roller axis and constituting a guide roller for guiding the film to said take-off roller, said guide roller being positioned so that part of the weight of the film winding bears thereon, and means for rotating said take-off roller.

17. In film-projection apparatus comprising a projector having film-feeding means including a sprocket wheel, a film holder for a roll of endless film a take-off roller associated with said holder for progressively withdrawing the film from said holder for supplying the same to said projector, rollers for advancing the withdrawn film to said sprocket wheel of the projector, a bracket mounted on said projector for supporting said film-advancing rollers in line with said sprocket wheels, pulleys in fixed relation to said rollers, respectively, for rotating the same, and a belt engaging said pulleys and driven by said projector for actuating said pulleys to rotate said film-advancing rollers in timed relation to said film-feeding means of the projector.

18. In film-projection apparatus comprising a projector having film-feeding means including a sprocket wheel, a film holder for a roll of endless film, a take-off roller associated with said holder for progressively withdrawing the film from said holder for supplying the same to said projector, rollers for advancing the withdrawn film to said sprocket wheel of the projector, a film holder for a roll of endless film which is withdrawn progressively from the innermost convolution of the roll for supply to the projector during the operation thereof and which is rewound progressively in the outermost convolution of said roll, rollers for advancing the film to said sprocket wheel, pulleys in fixed relation to said rollers, respectively, for rotating the same, and a belt engaging said pulleys and driven by said projector for actuating said pulleys to rotate said film-advancing rollers in timed relation to said film-feeding means of the projector.

RUSSELL R. KELLEY.